United States Patent
Nagaoka et al.

(10) Patent No.: US 9,324,235 B2
(45) Date of Patent: Apr. 26, 2016

(54) DRIVING ASSISTANCE SYSTEM

(71) Applicant: HONDA MOTOR CO., LTD., Minato-Ku, Tokyo (JP)

(72) Inventors: Nobuharu Nagaoka, Saitama (JP); Makoto Aimura, Saitama (JP); Yusuke Nakamura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 208 days.

(21) Appl. No.: 14/346,652

(22) PCT Filed: Oct. 5, 2012

(86) PCT No.: PCT/JP2012/075951
§ 371 (c)(1),
(2) Date: Mar. 21, 2014

(87) PCT Pub. No.: WO2013/099391
PCT Pub. Date: Jul. 4, 2013

(65) Prior Publication Data
US 2014/0219510 A1  Aug. 7, 2014

(30) Foreign Application Priority Data

Dec. 27, 2011 (JP) ................................ 2011-285911

(51) Int. Cl.
*G06K 9/00* (2006.01)
*G08G 1/16* (2006.01)
(Continued)

(52) U.S. Cl.
CPC ............... *G08G 1/164* (2013.01); *B60W 30/09* (2013.01); *B60W 30/095* (2013.01); *B60W 40/04* (2013.01);
(Continued)

(58) Field of Classification Search
CPC . G06K 9/3258; G06K 2209/15; G06K 9/325; G06K 9/6267
See application file for complete search history.

(56) References Cited

U.S. PATENT DOCUMENTS 6,611,740 B2 * 8/2003 Lowrey ................. G01M 15/04
379/1.01
6,636,790 B1 * 10/2003 Lightner ............. G01M 15/102
701/31.4
(Continued)

FOREIGN PATENT DOCUMENTS

DE  102006057741 A1  9/2007
DE  102009008959 A1  9/2009
(Continued)

OTHER PUBLICATIONS

Partial supplementary European search report dated Feb. 12, 2016 issued in the counterpart European Patent Application EP 12 86 3703.
(Continued)

*Primary Examiner* — Shefali Foradia
(74) *Attorney, Agent, or Firm* — Carrier Blackman & Associates, P.C.; Joseph P. Carrier; William D. Blackman

(57) ABSTRACT

A vehicle (1) having a vehicle information acquisition unit (11) which acquires image captured by a vehicle mounted sensor (20) and a camera (21), a vehicle information transmission unit (13) which transmits vehicle information data indicating information acquired by the vehicle information acquisition unit (11) to a host computer (50), a first arithmetic processing result reception unit (14) which receives first arithmetic processing result data replied from the host computer (50), and a driving assistance unit (17) which executes driving assistance processing based on the first arithmetic processing result data, the host computer (50) has a vehicle information reception unit (52) which receives vehicle information data, a first arithmetic processing unit (53) which executes first arithmetic processing on vehicle information data, and a first arithmetic processing result transmission unit (54) which transmits first arithmetic processing result data indicating the first arithmetic processing result to the vehicle (1).

10 Claims, 6 Drawing Sheets

(51) Int. Cl.
  *B60W 30/09* (2012.01)
  *B60W 30/095* (2012.01)
  *B60W 40/04* (2006.01)
  *B60W 40/06* (2012.01)
  *G08G 1/13* (2006.01)

(52) U.S. Cl.
  CPC ........... *B60W 40/06* (2013.01); *G06K 9/00805* (2013.01); *G08G 1/13* (2013.01); *G08G 1/166* (2013.01); *G08G 1/167* (2013.01)

(56) References Cited

U.S. PATENT DOCUMENTS

| | | | |
|---|---|---|---|
| 8,781,733 B2 | 7/2014 | Staehlin et al. | |
| 2010/0114474 A1* | 5/2010 | Suganuma | G01C 21/26 701/532 |
| 2012/0133738 A1 | 5/2012 | Hoffmeier et al. | |
| 2013/0338852 A1* | 12/2013 | Otake | B60T 7/12 701/1 |

FOREIGN PATENT DOCUMENTS

| | | |
|---|---|---|
| DE | 102009016580 A1 | 10/2010 |
| JP | 2001-006096 A | 1/2001 |
| JP | 2007-024564 A | 2/2007 |
| JP | 2010-055244 A | 3/2010 |
| JP | 2011-077803 A | 4/2011 |

OTHER PUBLICATIONS

Morimoto et al., "AHS Road-to-Vehicle Communication System," IEEE, Oct. 5, 1999, pp. 327-334.

* cited by examiner

DRIVING ASSISTANCE SYSTEM

TECHNICAL FIELD

The present invention relates to a driving assistance system which assists driving of a vehicle based on information obtained by the vehicle during traveling.

Conventionally, there is proposed a driving assistance system which assists a driving of a vehicle by detecting an object (objects to be monitored such as a pedestrian, other vehicles, artificial structures or the like) existing in the periphery of the vehicle based on a captured image by a camera mounted in the vehicle or ranging information by a radar or the like, and by determining a contact possibility of the vehicle and the object and then to output an alarm (for example, refer to Patent Document 1).

CITATION LIST

Patent Document

Patent Document 1: Japanese Patent Application Laid-Open No. 2001-6096

SUMMARY OF INVENTION

Technical Problem

In the driving assistance system recited in Patent Document 1, an image processing unit for performing various arithmetic processing with respect to the captured image by the vehicle mounted camera is provided in the vehicle, and the object existing in the periphery of the vehicle is detected by the arithmetic processing by the image processing unit.

Here, in order to increase the detection speed or the detection accuracy of the object, in a case of implementing a specification change of the image processing unit, it is necessary to develop a hardware (CPU or the like) capable of being installed in a vehicle and a software according thereto. Since the function is limited for the hardware capable of being installed in a vehicle, there are cases where the development efficiency becomes low.

The present invention has been made in view of such background, and aims to provide a driving assistance system which enables to enhance development efficiency.

Solution to Problem

The present invention has been made in view of the above background and relates to a driving assistance system of a vehicle comprising a vehicle and a host computer capable of mutual communication, the vehicle comprising: a vehicle information acquisition unit configured to acquire information related to at least one of a traveling condition of the vehicle and an object existing in a periphery of the vehicle; a vehicle information transmission unit configured to transmit vehicle information data indicating information acquired by the vehicle information acquisition unit to the host computer; a first arithmetic processing result reception unit configured to receive first arithmetic processing result data indicating a result of a predetermined first arithmetic processing on the vehicle information data which is replied from the host computer according to the transmission of the vehicle information data; and a driving assistance unit configured to perform a predetermined first driving assistance processing based on the first arithmetic processing result data, the host computer comprising: a vehicle information reception unit configured to receive the vehicle information data transmitted from the vehicle; a first arithmetic processing unit configured to perform the first arithmetic processing on the vehicle information data; and a first arithmetic processing result transmission unit configured to transmit the first arithmetic processing result data indicating the result of the first arithmetic processing to the vehicle (first aspect of the invention).

According to the first aspect of the invention, information regarding at least one of the traveling condition of the vehicle and the object existing in the periphery of the vehicle is acquired by the vehicle information acquisition unit equipped in the vehicle, and the vehicle information data indicating this information is transmitted to the host computer by the vehicle information transmission unit. Then, the first arithmetic processing of the vehicle information data is performed by the first arithmetic processing unit of the host computer, and the first arithmetic processing result data indicating the result is transmitted to the vehicle by the first arithmetic processing result transmission unit. The first arithmetic processing result data is received by the first arithmetic processing result reception unit of the vehicle, and the first driving assistance processing based on the first arithmetic processing result data is performed by the driving assistance unit.

As such, according to the first aspect of the invention, the first arithmetic processing with a large calculation load is performed by the host computer, and the vehicle performs the acquisition and transmission of the vehicle information data and the first driving assistance processing based on the first arithmetic processing result data which have a small calculation load. In such case, since the host computer is not restricted as in the case of being installed in the vehicle, it can be configured by using high performance hardware, and enables to enhance the development efficiency of the first arithmetic processing improvement or the like.

According to the first aspect of the invention, the host computer comprises an update communication unit configured to communicate with an update computer, and a first arithmetic processing change unit configured to change a content of the first arithmetic processing by a software change data received by the update communication unit (second aspect of the invention).

According to the second aspect of the invention, by transmitting a version up data or the like of a program for the first arithmetic processing as the software change data to the host computer, it is possible to change the content of the first arithmetic processing. In such case, it is not necessary to change the hardware and the software with respect the vehicle.

According to the second aspect of the invention, the update computer is configured to determine a content of the software change data which is transmitted to the host computer according to an operation by a user (third aspect of the invention).

According to the third aspect of the invention, the user is able to determine the content of the first arithmetic processing according to his/her demand by operating the update computer.

According to the first to the third aspect of the invention, the first arithmetic processing result transmission unit is configured to, in a case where the communication between the host computer and the vehicle switches from a capable state to an incapable state, sequentially transmit to the vehicle a non-communicable state countermeasure data which instructs to perform a processing according to an elapsed time from a time point of switching to the incapable state, as the first arithmetic processing result data, until communication with the vehicle becomes capable next time (fourth aspect of the invention).

According to the fourth aspect of the invention, when the communication between the host computer and the vehicle returns to the capable state from the incapable state, the first arithmetic processing result reception unit of the vehicle receives the non-communicable state countermeasure data, and is able to promptly perform the processing instructed by the non-communicable state countermeasure data.

According to the fourth aspect of the invention, the first arithmetic processing result transmission unit is configured to determine a content of the processing instructed by the non-communicable state countermeasure data based on the result of the first arithmetic processing on the vehicle information data received by the vehicle information reception unit when the communication between the host computer and the vehicle was capable (fifth aspect of the invention).

According to the fifth aspect of the invention, it is able to appropriately set the content of the processing to be instructed by the non-communicable state countermeasure data based on the result which was obtained by the first arithmetic processing prior to the communication between the host computer and the vehicle becoming incapable.

According to any one of the first to fifth aspect of the invention, the vehicle comprises a second arithmetic processing unit configured to perform a predetermined second arithmetic processing on the vehicle information data, and the driving assistance unit performs a predetermined second driving assistance processing based on a result of the second arithmetic processing when the communication with the host computer is incapable (sixth aspect of the invention).

According to the sixth aspect of the invention, even in a case where the communication between the vehicle and the host computer is incapable, by performing the second arithmetic processing on the vehicle information data by the second arithmetic processing unit, it is able to perform the second driving assistance processing by the driving assistance unit and to continue the driving assistance.

According to the sixth aspect of the invention, the second arithmetic processing unit is provided in a potable terminal which is placed inside an interior of the vehicle and capable of communication with the vehicle information acquisition unit and the driving assistance unit, and is configured to perform the second arithmetic processing on the vehicle information data received from the vehicle information acquisition unit, and to transmit a second arithmetic processing result data which indicates a result of the second arithmetic processing to the driving assistance unit (seventh aspect of the invention).

According to the seventh aspect of the invention, for example, by installing a program so as to function as the second arithmetic processing unit to the portable terminal (a note-type personal computer or the like) possessed by the user of the vehicle, and by performing the program, it is able to configure the second arithmetic processing unit by using the function of the portable terminal.

According to the sixth or seventh aspect of the invention, the vehicle information acquisition unit is configured to acquire information related to the object existing in the periphery of the vehicle, the second arithmetic processing unit is configured to perform a processing of determining a contact possibility of the vehicle and the object with respect the vehicle information data including information related to the object existing in the periphery of the vehicle acquired by the vehicle information acquisition unit, as the second arithmetic processing, and the driving assistance unit is configured to perform a contact avoidance processing for avoiding the contact when communication with the host computer is in an incapable state and also a predicted time until the contact between the vehicle and the object is determined to be equal to or less than a predetermined time from the result of the second arithmetic processing, and when the communication with the host computer becomes capable during execution of the contact avoidance processing, configured to prohibit execution of the first driving assistance processing and to continue the contact avoidance processing (eight aspect of the invention).

According to the eighth aspect of the invention, in a case where the communication with the host computer is in the incapable state and also when the vehicle approaches the object and the contact avoidance processing is being executed, the driving assistance unit of the vehicle is able to avoid the delay of taking measures to avoid contact between the vehicle and the object by switching to the first driving assistance processing according to the communication with the host computer.

According to the sixth or the seventh aspect of the invention, the vehicle information acquisition unit is configured to acquire information related to the object existing in the periphery of the vehicle, the first arithmetic processing unit is configured to perform a processing of determining a contact possibility of the vehicle and the object with respect the vehicle information data including information related to the object existing in the periphery of the vehicle acquired by the vehicle information acquisition unit, as the first arithmetic processing, and when the communication with the vehicle returns to a capable state from an incapable state and the first arithmetic processing is performed, to continue the first arithmetic processing if a predicted time until the vehicle and the object contact is longer than a predetermined time, and to terminate the first arithmetic processing and to transmit to the vehicle contact avoidance instruction data which instructs a contact avoidance control for avoiding contact of the vehicle and the object if the predicted time until the vehicle and the object contact is equal to or less than the predetermined time, and the driving assistance unit is configured to perform the contact avoidance control when the contact avoidance instruction data is received (ninth aspect of the invention).

According to the ninth aspect of the invention, the first arithmetic processing unit stops the first arithmetic processing and transmits the contact avoidance instruction data which instructs the contact avoidance control to the vehicle, when the communication with the vehicle returns to the capable state from the incapable state and the first arithmetic processing is performed, if the predicted time until the contact between the vehicle and the object is the predetermined time or less. By doing so, it is able to quickly execute the contact avoidance control of the vehicle and the object by the driving assistance unit.

According to the sixth or the seventh aspect of the invention, the vehicle comprises a road environment recognition unit configured to recognize a road environment where the vehicle is traveling, the vehicle information acquisition unit is configured to acquire a captured image of a camera equipped to the vehicle as the information related to the object existing in the periphery of the vehicle, and the second arithmetic processing unit is configured to detect an animal preferentially as the object from the captured image and to perform a processing of determining a contact possibility with the vehicle, as the second arithmetic processing, when it is recognized by the road environment recognition unit that the vehicle is traveling a road in a suburban area, and configured to detect a pedestrian preferentially as the object from the captured image and to perform the processing of determining the contact possibility with the vehicle, as the second arithmetic processing, when it is recognized by the road environment recognition unit that the vehicle is traveling a road in a city area (tenth aspect of the invention).

According to the tenth aspect of the invention, in a case of performing the driving assistance processing by the driving assistance unit based on the result of the second arithmetic processing by the second arithmetic processing unit when the communication between the vehicle and the host computer is incapable, by limiting the object to be detected according to the road environment in which the vehicle is traveling, it is able to reduce the burden of the second arithmetic processing unit thereby to increase the processing speed of the second arithmetic processing.

According to the sixth or the seventh aspect of the invention, the vehicle information acquisition unit is configured to acquire a captured image of a camera equipped to the vehicle as the information related to the object existing in the periphery of the vehicle, and the second arithmetic processing unit is configured, according to a selection operation by a driver of the vehicle, to switch between a contact determination processing which detects the object from the captured image and determines a contact possibility with the vehicle, and a lane mark recognition processing which recognizes a lane mark laying on the road from the captured image and calculates an interval with the vehicle, and thereby to perform it as the second arithmetic processing (eleventh aspect of the invention).

According to the eleventh aspect of the invention, by performing the second arithmetic processing by limiting it to either one of the contact determination processing and the lane mark recognition processing, it is able to reduce the burden of the second arithmetic processing unit and to increase the processing speed of the second arithmetic processing.

DESCRIPTION OF EMBODIMENTS

Figure 1:
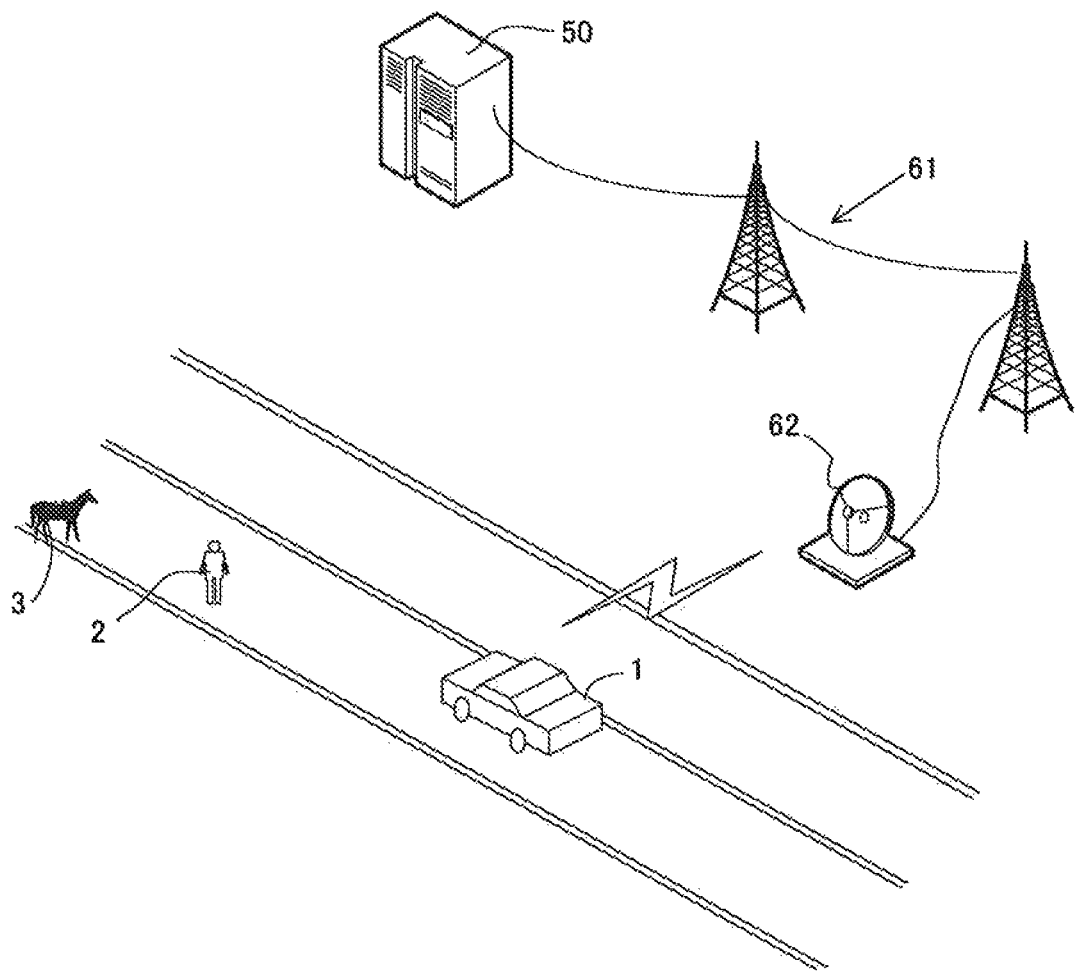
FIG. 1 is an explanatory view of an usage manner of a driving assistance system.

Embodiments of a driving assistance system of the present invention will be explained with reference to FIG. 1 through FIG. 6. With reference to FIG. 1, the driving assistance system of the present embodiment is configured by comprising a vehicle 1 and a host computer 50 capable of mutually communicating with a relay station 62 via an optical communication line 61. The vehicle 1 assists driving by providing an alert or the like to the driver when a pedestrian 2 or an animal 3 is detected from a captured image of ahead by a camera (refer to FIG. 2).

Figure 2:
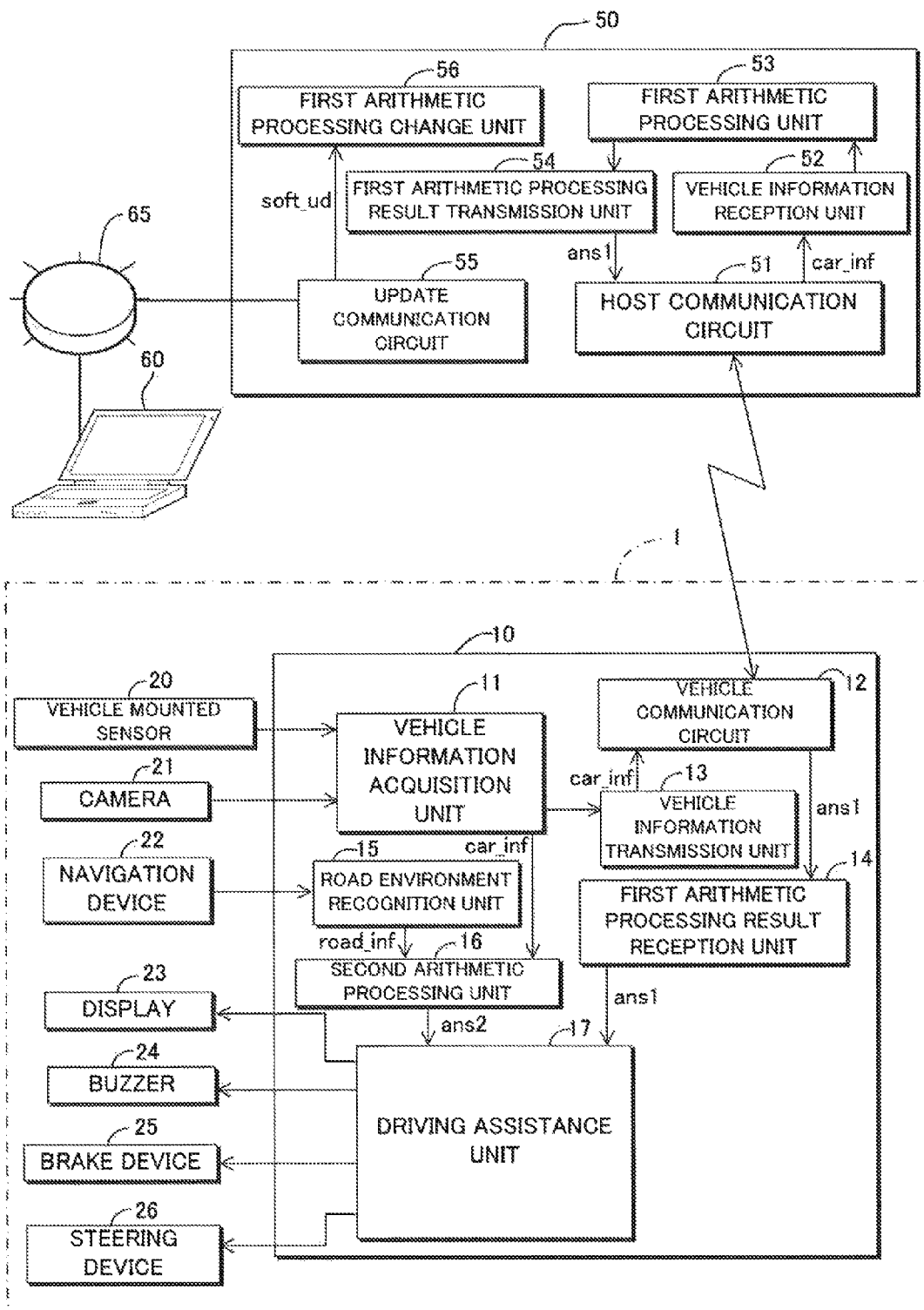
FIG. 2 is a block diagram of a vehicle and a host computer configuring the driving assistance system.

With reference to FIG. 2, the vehicle 1 is equipped with an ECU (Electric Control Unit) 10 which is an electronic circuit unit configured of a CPU, memory, input/output interface and the like, which are not illustrated. The vehicle 1 is further equipped with a vehicle mounted sensor 20 which detects information related to a traveling condition of the vehicle 1 such as a behavior (velocity, acceleration, yaw rate, or the like) of the vehicle 1 and an operation condition by a driver (brake manipulation, accelerator manipulation, steering manipulation, or the like), a camera 21 which captures an image ahead of the vehicle 1, a navigation device 22, a display 23, a buzzer 24, a braking device 25, and a steering device 26.

The ECU 10 functions as a vehicle information acquisition unit 11, a vehicle information transmission unit 13, a first arithmetic processing result reception unit 14, a road environment recognition unit 15, a second arithmetic processing unit 16, and a driving assistance unit 17 by executing a program for driving assistance of the vehicle 1 stored in the memory by the CPU. Furthermore, the ECU 10 is equipped with a vehicle communication circuit 12 for communicating with the host computer 50.

The vehicle information acquisition unit 11 acquires various data indicating a detection result by the vehicle mounted sensor 20 and data of an image captured by the camera 21. The vehicle information transmission unit 13 transmits the data acquired by the vehicle information acquisition unit 11 to the host computer 50 as vehicle information data (car_inf). The road environment recognition unit 15 recognizes whether the vehicle 1 is traveling in a city area or is traveling in a suburban area or the like from a position information of the vehicle 1 and a map information output from the navigation device 22, and generates road environment data (road_inf) indicating the recognition result.

The first arithmetic processing result reception unit 14 receives a first arithmetic processing result data (ans1) returned from the host computer 50, in response to the transmission of the vehicle information data (car_inf) by the vehicle information transmission unit 13. The first arithmetic processing result data (ans1) indicates a result of a first arithmetic processing (a contact determination processing with an object existing ahead of the vehicle 1 which will be described later) executed by the host computer 50.

The second arithmetic processing unit 16 detects an object existing ahead of the vehicle 1 and performs processing of determining a contact possibility with the vehicle 1, similar to the first arithmetic processing described later, based on the vehicle information data (car_inf) and the road environment data (road_inf).

The driving assistance unit 17 basically performs warning to the driver and braking of the vehicle 1 based on the first arithmetic processing result data (ans1) received by the first arithmetic processing result reception unit 14 when the communication with the host computer 50 is capable, and performs warning to the driver based on a second arithmetic processing result data (ans2) by the second arithmetic processing unit 16 when the communication with the host computer 50 is incapable.

More specifically, the driving assistance unit 17 displays an outer frame of an image portion of the object on the display 23, and also makes the buzzer 24 sound to alert the driver. Moreover, the driving assistance unit 17 actuates the braking device 25 and puts a brake on the vehicle 1.

Next, the host computer 50 is configured by a CPU, memory, input/output interface or the like not illustrated, and functions as a vehicle information reception unit 52, a first arithmetic processing unit 53, a first arithmetic processing result transmission unit 54, and a first arithmetic processing change unit 56 by executing a control program for driving assistance stored in the memory. Moreover, the host computer 50 is equipped with a host communication circuit 51 for performing communication with the vehicle 1, and an update communication circuit 55 (corresponding to an update communication unit of the present invention) for performing communication with an update computer 60 connected via a communication line 65.

The vehicle information reception unit 52 receives the vehicle information data (car_inf) transmitted from the vehicle 1 via the host communication circuit 51. The first arithmetic processing unit 53 detects the object existing ahead of the vehicle 1 and executes a processing (first arithmetic processing) to determine the contact possibility with the vehicle 1 based on the vehicle information data (car_inf).

The first arithmetic processing result transmission unit 54 transmits the first arithmetic processing result data (ans1) indicating a processing result by the first arithmetic processing unit 53 to the vehicle 1 via the host communication circuit 51. The first arithmetic processing change unit 56 changes the content of the first arithmetic processing when a software change data (soft_ud) transmitted from the update computer 60 is received via the update communication circuit 55.

As the software change data (soft_ud), data or the like for specification change of a program for the first arithmetic processing according to a version up of the program for the first arithmetic processing or change of a hardware of the host computer 50, is transmitted. Moreover, the operator of the update computer 60 is able to designate the content of the first arithmetic processing according to the user's demand or the like of the vehicle 1 in the operation menu of the update computer 60. The update computer 60 transmits software change data (soft_ud) determined according to this designation to the host computer 50.

The host computer 50 and the vehicle 1 both have a synchronous timer to time in synchronization during operation or in order to commonly recognize an elapsed time since the intercommunication has stopped. As such, by providing the synchronous timer to the host computer 50 and the vehicle 1, the host computer 50 and the vehicle 1 recognize a time point when intercommunication became incapable and a time point when it returned to a communication capable state after the communication became incapable, and the like.

Figure 3:
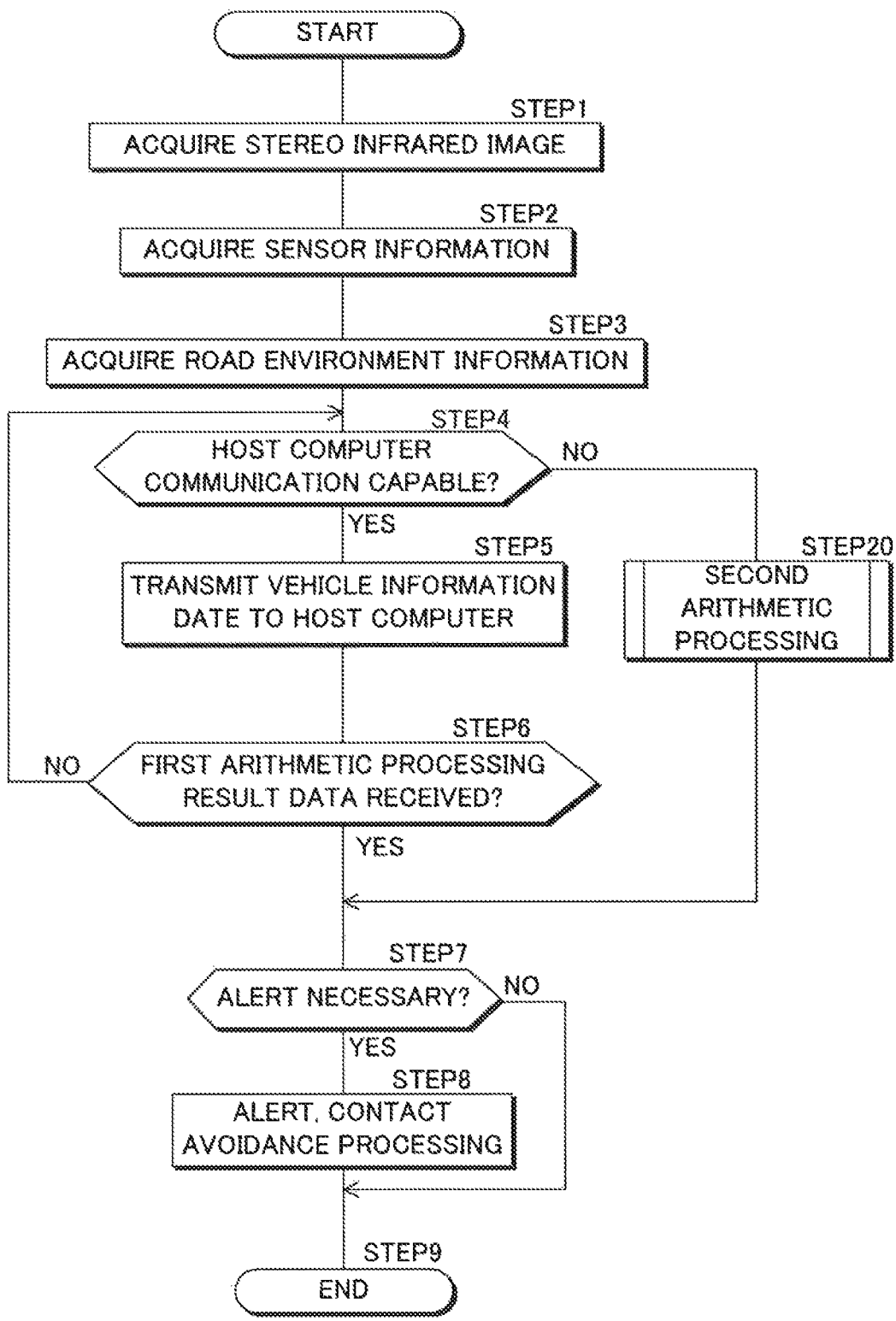
FIG. 3 is an operation flowchart of an ECU provided in the vehicle.

Next, the processing by the ECU 10 provided in the vehicle 1 is explained according to the flowchart shown in FIG. 3. STEP 1 to STEP 2 of FIG. 3 is a processing by the vehicle information acquisition unit 11. In STEP 1, the vehicle information acquisition unit 11 acquires a stereo infrared image by the camera 21 (a stereo infrared camera is used in the present embodiment). In STEP 2, the vehicle information acquisition unit 11 acquires the detection information by the vehicle mounted sensor 20.

The succeeding STEP 3 is a processing by the road environment recognition unit 15. The road environment recognition unit 15 recognizes whether the vehicle 1 is traveling in a city area or traveling in a suburban area from the position information of the vehicle 1 and the map information received from the navigation device 22, and outputs road environment data (road_inf) indicating the recognition result to the second arithmetic processing unit 16.

The next STEP 4 to STEP 5 are processing by the vehicle information transmission unit 13. The vehicle information transmission unit 13 determines whether or not it is in a state capable of communication with the host computer 50. If it is in a state capable of communication with the host computer 50, proceeds to STEP 5, and the vehicle information transmission unit 13 transmits the vehicle information data (car_inf) to the host computer 50, and proceeds to STEP 6.

On the other hand, if it is in a state incapable of communication with the host computer 50, the processing branches to STEP 20. STEP 20 is a processing by the second arithmetic processing unit 16 (second arithmetic processing). The second arithmetic processing unit 16 preferentially detects a pedestrian among the objects existing ahead of the vehicle 1, and determines the contact possibility with the vehicle 1, based on the vehicle information data (car_inf) when it is recognized by the road environment recognition unit 15 that the vehicle 1 is traveling a road in a city area.

Moreover, when it is recognized by the road environment recognition unit 15 that the vehicle 1 is traveling a road in the suburban area, the second arithmetic processing unit 16 preferentially detects an animal (wild animal and domestic animal such as deer, horse, or the like) among the objects existing afar from the vehicle 1, and determines the contact possibility with the vehicle based on the vehicle information data (car_inf), and then proceeds to STEP 7.

Here, the ECU 10 has lower processing ability compared to the host computer 50 due to the restriction of being mounted in the vehicle 1. Therefore, by providing priority order to the type of objects to be detected according to the road environment in which the vehicle 1 is traveling, it is able to shorten the detection time of the object having high possibility of existing, and to efficiently determine the contact possibility.

STEP 7 to STEP 8 is a processing by the driving assistance unit 17. In STEP 7, the driving assistance unit 17 determines whether or not it is necessary to alert the driver based on the first arithmetic processing result data (ans1) or the second arithmetic processing result data (ans2). Then, proceeds to STEP 8 when it is necessary to provide an alert to the driver.

In STEP 8, the driving assistance unit 17 provides an alert by the display 23 and the buzzer 24, and puts a brake on the vehicle 1 by the braking device 25 when necessary, then proceeds to STEP 9 and terminates the processing. On the other hand, when it is not necessary to alert the driver, the processing branches to STEP 9 and terminates the processing.

The processing by the driving assistance unit 17 based on the first arithmetic processing result data (ans1) corresponds to the first driving assistance processing of the present invention. The processing by the driving assistance unit 17 based on the second arithmetic processing result data (ans2) corresponds to the second driving assistance processing of the present invention.

Figure 4:
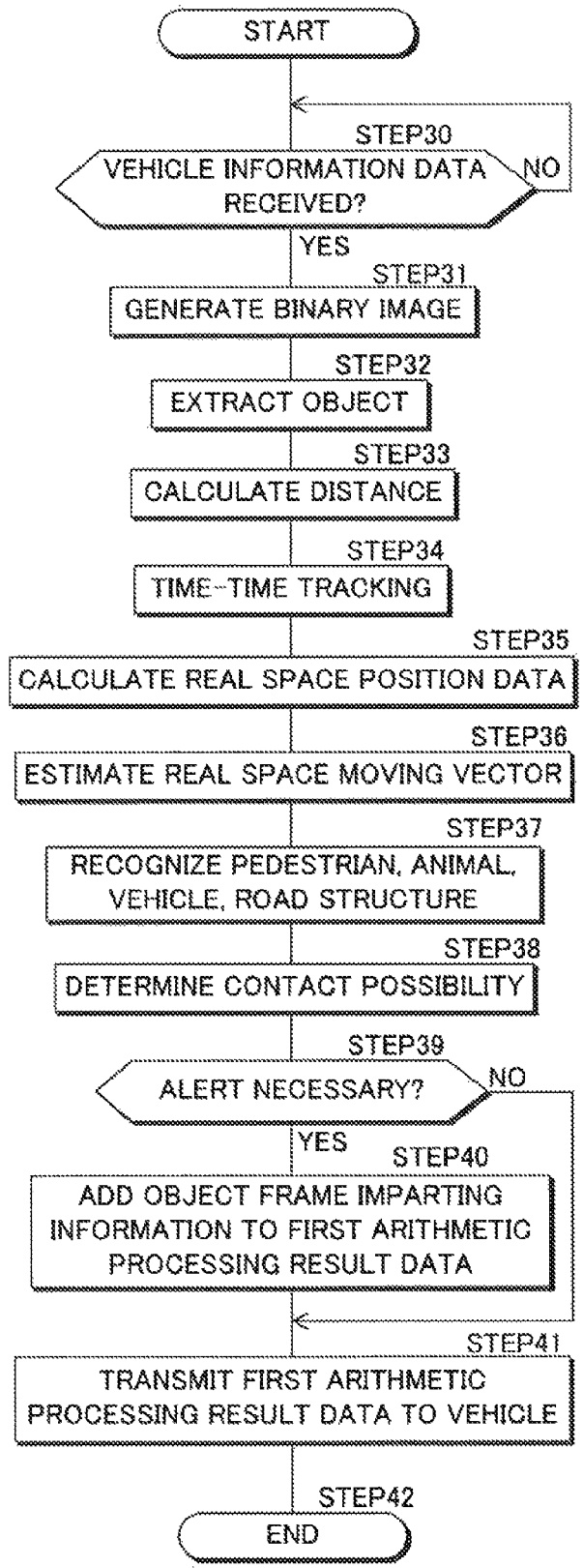
FIG. 4 is an operation flowchart of the host computer.

Next, the processing by the host computer 50 is explained according to the flowchart indicated in FIG. 4. STEP 30 in FIG. 4 is a processing by the vehicle information reception unit 52. The vehicle information reception unit 52 receives vehicle information data (car_inf) transmitted from the vehicle 1.

Succeeding STEP 31 to STEP 38 are processing by the first arithmetic processing unit 53. The first arithmetic processing unit 53 binarizes the captured image to generate a binary image in STEP 31, and extracts the object from the binary image in STEP 32. Moreover, the first arithmetic processing unit 53 calculates the distance between the vehicle 1 and the object from the parallax of the stereo image in STEP 33, and performs time-time tracking of the object in STEP 34.

Then, the first arithmetic processing unit 53 calculates real space position data of the object in the next STEP 35, and estimates the real space moving vector of the object in STEP 36. In the succeeding STEP 37, the first arithmetic processing unit 53 recognizes the object as either one of a pedestrian, animal, vehicle, or a road structure. In the next STEP 38, the first arithmetic processing unit 53 determines the contact possibility of the object and the vehicle 1 by the real space moving vector of the object when the object is not a road structure. Then, generates the first arithmetic processing result data (ans1) indicating this determination result.

The processing of STEP 31 to STEP 38 is according to a known technology recited in the previously mentioned Patent Document 1 or the like, and therefore the detailed explanation is abbreviated.

In succeeding STEP 39, when there is a possibility that the object and the vehicle 1 will contact, the first arithmetic processing unit 53 determines that an alert is necessary, and proceeds to STEP 40. In STEP 40, the first arithmetic processing unit 53 adds to the first arithmetic processing result data (ans1), an information for providing an outer frame of the object to the display screen of the display 23 (refer to FIG. 2) of the vehicle 1. On the other hand, when there is no possibility that the object and the vehicle 1 will contact, the processing branches to STEP 41.

STEP 41 is a processing by the first arithmetic processing result transmission unit 54. The first arithmetic processing result transmission unit 54 transmits the first arithmetic processing result data (ans1) generated by the first arithmetic processing unit 53 to the vehicle 1, and proceeds to STEP 42 to terminate the processing.

Here, since the host computer 50 does not have restrictions for being mounted in the vehicle like the ECU 10, it is able to adopt hardware having high performance. Therefore, the processing of STEP 31 to STEP 38 in FIG. 4 can be performed in high speed. Moreover, in a case of changing the content of the processing of STEP 31 to STEP 38, since it is not necessary to change the specification of the ECU 10 of the vehicle 1, it is able to easily perform the algorithm or the like for object detection and contact possibility determination of the object and the vehicle 1, only by changing the program of the host computer 50.

Figure 5:
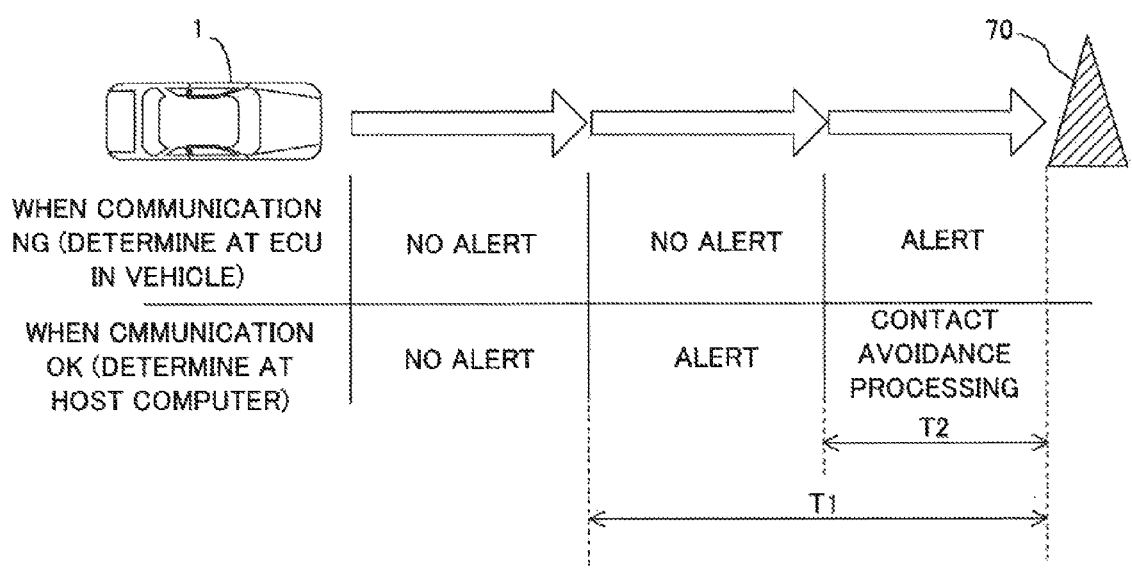
FIG. 5 is an explanatory view of a processing when a communication between the vehicle and the host computer returned to a capable state from an incapable state.

Next, FIG. 5 shows a respond processing of a cases when the vehicle 1 approaches the object 70 by comparing a case where the communication between the vehicle 1 and the host computer 50 is incapable (communication NG) and the object detection and the contact possibility determination is being executed by the second arithmetic processing unit 16 of the ECU 10 of the vehicle 1, and a case where the communication between the vehicle 1 and the host computer 50 is capable (communication OK) and the object detection and the contact possibility determination is being executed by the first arithmetic processing unit 53 of the host computer 50 or the like.

In a case the object detection and the contact possibility determination is performed by the second arithmetic processing unit 16 of the ECU 10, the driving assistance unit 17 provides the alert by the display 23 and the buzzer 24 when the predicted time until the vehicle 1 contacts the object 70 is T1 or less.

In a case the object detection and the contact possibility determination is performed by the first arithmetic processing unit 53 of the host computer 50, the driving assistance unit 17 provides the alert by the display 23 and the buzzer 24 when the predicted time until the vehicle 1 contacts the object 70 is T1 or less. Moreover, when the predicted time until the vehicle 1 contacts the object 70 is T2 (<T1, corresponding to a predetermined time of the present invention) or less, the driving assistance unit 17 further actuates the braking device 25 to decelerate the vehicle 1.

In such case, in a state where the predicted time until the vehicle 1 contacts the object 70 is T2 or less and when it is switched from communication NG to communication OK, if the braking device 25 is immediately actuated by the driving assistance unit 17, it will be a sudden braking for the driver. Therefore, the driving assistance unit 17 does not switch to the processing by the first arithmetic processing unit 53 but continues the processing by the second arithmetic processing unit 16, in a state where the predicted time until the vehicle 1 contacts the object 70 is T2 or less and when it is switched from communication NG to communication OK. By doing so, execution of sudden braking for the driver is prevented.

Moreover, in a state where the predicted time until the vehicle 1 contacts the object 70 is T2 or less and when it is switched from communication NG to communication OK, in a case where it is recognized that the predicted time until the vehicle 1 contacts the object 70 is T2 or less by the first arithmetic processing unit 53, the first arithmetic processing by the first arithmetic processing unit 53 thereafter may be stopped in order to avoid contact of the vehicle 1 and the object.

Then, data (corresponding to contact avoidance instruction data of the present invention) instructing braking of the vehicle 1 (corresponding to contact avoidance control of the present invention) instead of the determination result of contact possibility or the like may be transmitted from the host computer 50 to the vehicle 1, and the driving assistance unit 17 of the vehicle 1 may immediately put a brake on the vehicle 1 according to the reception of this data.

Moreover, when the communication between the vehicle 1 and the host computer 50 transfers from the communication capable state to the incapable state, a first arithmetic processing result data (non-communicable state countermeasure data) which instructs the execution of processing according to the elapsed time from the time point of this transfer may be sequentially transmitted to the vehicle 1 by a predetermined time interval from the first arithmetic processing result transmission unit 54 of the host computer 50 during the communication incapable state.

More specifically, with reference to FIG. 5, according to the elapsed time from the time point of transferring to the communication incapable state, the host computer 50 transmits non-communicable countermeasure data which instructs a processing of executing the image display of the object to the vehicle 1, as the first arithmetic processing result data, when the predicted time until the contact of the vehicle 1 and the object 70 is longer than T1.

Moreover, when the predicted time until the contact of the vehicle 1 and the object 70 is between T1 and T2, the host computer 50 transmits to the vehicle 1 a non-communicable state countermeasure data for instructing an alarm as the first arithmetic processing result data. Furthermore, when the time until the contact of the vehicle 1 and the object 70 is shorter than T2, the host computer 50 transmits a non-communicable state countermeasure data for instructing the braking of the vehicle 1 to the vehicle 1 as the first arithmetic processing result data.

As such, when the communication between the vehicle 1 and the host computer 50 is incapable, the host computer 50 continues to sequentially transmit the non-communicable state countermeasure data. By doing so, when it returns to a state in which the communication between the vehicle 1 and the host computer 50 is capable, the non-communicable state countermeasure data is received by the first arithmetic processing result reception unit 14, and it is possible to make the driving assistance unit 17 of the vehicle 1 to promptly execute a processing according to the predicted time until the contact of the vehicle 1 and the object 70.

Furthermore, the content of the processing to be instructed by the non-communicable state countermeasure data may be determined based on the result of the first arithmetic processing with respect to the vehicle information data received by the vehicle information reception unit 52 when the communication between the vehicle 1 and the host computer 50 was capable. For example, if the type of object was recognized by the first arithmetic processing, non-communicable state countermeasure data for instructing an execution of processing according to the type is transmitted. Moreover, in a case where the communication between the host computer 50 and the vehicle 1 became incapable in a state where the distance between the vehicle 1 and the object 70 is considerably long, a non-communicable state countermeasure data narrowed to only the processing instructing the braking of the vehicle 1 having the highest priority order, is transmitted.

Figure 6:
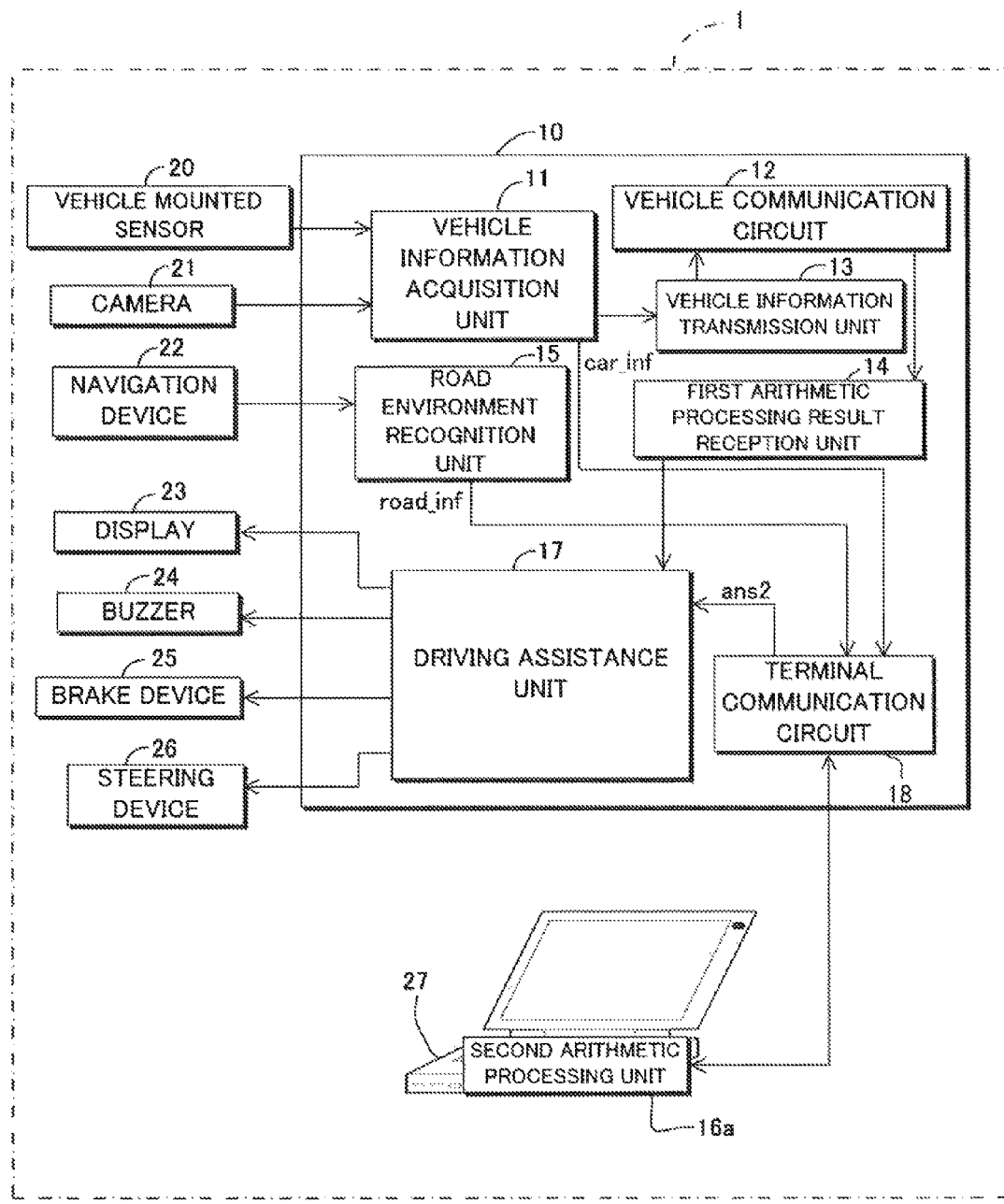
FIG. 6 is an explanatory view of another configuration of a second arithmetic processing unit provided in the vehicle.

Next, FIG. 6 shows another configuration example of the vehicle 1. In the vehicle 1 shown in FIG. 6, the ECU 10 and a portable terminal (a note-type computer or the like) 27 placed in the interior of the vehicle 1 are able to communicate by cable or wireless communication. The portable terminal 27 functions as the second arithmetic processing unit 16a by making the CPU stored in the memory execute a program for driving assistance. The calculation processing performance of the portable terminal 27 is higher than ECU 10.

The second arithmetic processing unit 16a of the portable terminal 27 receives vehicle information data (car_inf) from the vehicle information acquisition unit 11 and also receives road environment data (road_inf) from road environment recognition unit 15 via a terminal communication circuit 18 provided in the ECU 10. Then, similar to the second arithmetic processing unit 16 shown in FIG. 2, the second arithmetic processing unit 16a executes detection of an object existing ahead of the vehicle 1 and processing for determining the contact possibility of the detected object and the vehicle 1 based on the vehicle information data (car_inf) and the road environment data (road_inf) as the second arithmetic processing.

The second arithmetic processing unit 16a transmits the second arithmetic processing result data (ans2) indicating the processing result to the driving assistance unit 17 of the ECU 10 via the terminal communication circuit 18 of the ECU 10. Similar to the case of the configuration of FIG. 2, the driving assistance unit 17 provides an alert by the display 23 and the buzzer 24 in a case where there is a possibility of contact between the vehicle 1 and the object.

By the configuration shown in FIG. 6, by having the portable terminal 27 which has a higher calculation ability than ECU 10 function as the second arithmetic processing unit 16a, it is able to shorten the processing time of the second arithmetic processing. Moreover, it is able to reduce the calculation load of the ECU 10.

In the present embodiment, detection of the object existing ahead of the vehicle 1 and the processing of determining the contact possibility is performed as the first arithmetic processing and the second arithmetic processing, processing including other contents may be performed as long as it is a processing for executing the driving assistance of the vehicle 1.

For example, the vehicle 1 may recognize a lane mark (white line, yellow line, or the like) laying on the road which the vehicle 1 is traveling, and may execute a processing of calculating an interval between the lane mark and the vehicle 1 (lane mark recognition processing) as the first arithmetic processing and the second arithmetic processing. In such case as the driving assistance processing, the driving assistance unit 17 provides an alert by the display 23 and the buzzer 24 when the interval between the lane mark and the vehicle 1 deviates a predetermined range, and performs a processing to actuate the steering device 26 (refer to FIG. 2) so as to maintain the vehicle 1 within the lane (lane keeping processing).

Moreover, in a state when the communication between the vehicle 1 and the host computer 50 is capable and when performing the driving assistance by the driving assistance unit 17 based on the result of the first arithmetic processing by the first arithmetic processing unit 53, both of the contact avoidance processing and the lane keeping processing may be performed. While in a state when the communication between the vehicle 1 and the host computer 50 is incapable and when performing the driving assistance by the driving assistance unit 17 based on the result of second arithmetic processing by the second arithmetic processing unit 16,16a, only either one of the contact determination processing and the lane keeping processing may be performed according to a selection operation by the driver. By doing so, the calculation load of the ECU 10 and the portable terminal 27, which have a lower calculation ability compared to the host computer 50, can be reduced, and the responsiveness of the driving assistance can be enhanced.

Moreover, in the present embodiment, an object existing ahead of the vehicle 1 is detected by the camera 21, and the contact possibility of the vehicle 1 and the object is determined. However, an object existing in the rearward or side of the vehicle 1 may be detected and the contact possibility of the vehicle 1 and the object may be determined.

Moreover, in the present embodiment, although an object existing in the periphery of the vehicle 1 is detected by using a stereo infrared camera, a visible light camera may be used or a monocular camera may be used. Alternatively, the object may be detected by using other object detection devices such as radar or the like.

INDUSTRIAL APPLICABILITY

The present invention can be used to enhance the development efficiency of a driving assistance system which assists the driving of the vehicle based on information acquired by the traveling vehicle.

REFERENCE SIGNS LIST

1 . . . vehicle, 10 . . . ECU, 11 . . . vehicle information acquisition unit, 12 . . . vehicle communication circuit, 13 . . . vehicle information transmission unit, 14 . . . first arithmetic processing result reception unit, 15 . . . road environment recognition unit, 16 . . . second arithmetic processing unit, 17 . . . driving assistance unit, 21 . . . camera, 27 . . . portable terminal, 50 . . . host computer, 51 . . . host communication circuit, 52 . . . vehicle information reception unit, 53 . . . first arithmetic processing unit, 54 . . . first arithmetic processing result transmission unit, 55 . . . update communication circuit, 56 . . . first arithmetic processing change unit, 60 . . . update computer

The invention claimed is:

1. A driving assistance system of a vehicle comprising a vehicle and a host computer capable of mutual communication, the vehicle comprising:
a vehicle information acquisition unit configured to acquire information related to at least one of a traveling condition of the vehicle and an object existing in a periphery of the vehicle;
a vehicle information transmission unit configured to transmit vehicle information data indicating information acquired by the vehicle information acquisition unit to the host computer;
a first arithmetic processing result reception unit configured to receive first arithmetic processing result data indicating a result of a predetermined first arithmetic processing on the vehicle information data which is replied from the host computer according to the transmission of the vehicle information data; and a driving assistance unit configured to perform a predetermined first driving assistance processing based on the first arithmetic processing result data, the host computer comprising:

a vehicle information reception unit configured to receive the vehicle information data transmitted from the vehicle;

a first arithmetic processing unit configured to perform the first arithmetic processing on the vehicle information data; and a first arithmetic processing result transmission unit configured to transmit the first arithmetic processing result data indicating the result of the first arithmetic processing to the vehicle.

2. The driving assistance system of the vehicle according to claim 1, wherein the host computer comprises, an update communication unit configured to communicate with an update computer, and a first arithmetic processing change unit configured to change a content of the first arithmetic processing by a software change data received by the update communication unit.

3. The driving assistance system of the vehicle according to claim 2, wherein, the update computer is configured to determine a content of the software change data which is transmitted to the host computer according to an operation by a user.

4. The driving assistance system of the vehicle according to claim 1, wherein the first arithmetic processing result transmission unit is configured to, in a case where the communication between the host computer and the vehicle switches from a capable state to an incapable state, sequentially transmit to the vehicle a non-communicable state countermeasure data which instructs to perform a processing according to an elapsed time from a time point of switching to the incapable state, as the first arithmetic processing result data, until communication with the vehicle becomes capable next time.

5. The driving assistance system of the vehicle according to claim 4, wherein the first arithmetic processing result transmission unit is configured to determine a content of the processing instructed by the non-communicable state countermeasure data based on the result of the first arithmetic processing on the vehicle information data received by the vehicle information reception unit when the communication between the host computer and the vehicle was capable.

6. The driving assistance system of the vehicle according to claim 1, wherein, the vehicle comprises, a second arithmetic processing unit configured to perform a predetermined second arithmetic processing on the vehicle information data, and the driving assistance unit performs a predetermined second driving assistance processing based on a result of the second arithmetic processing when the communication with the host computer is incapable.

7. The driving assistance system of the vehicle according to claim 6, wherein, the second arithmetic processing unit is provided in a potable terminal which is placed inside an interior of the vehicle and capable of communication with the vehicle information acquisition unit and the driving assistance unit, and is configured to perform the second arithmetic processing on the vehicle information data received from the vehicle information acquisition unit, and to transmit a second arithmetic processing result data which indicates the result of the second arithmetic processing to the driving assistance unit.

8. The driving assistance system of the vehicle according to claim 6, wherein, the vehicle information acquisition unit is configured to acquire information related to the object existing in the periphery of the vehicle, the second arithmetic processing unit is configured to perform a processing of determining a contact possibility of the vehicle and the object with respect the vehicle information data including information related to the object existing in the periphery of the vehicle acquired by the vehicle information acquisition unit, as the second arithmetic processing, and the driving assistance unit is configured to perform a contact avoidance processing for avoiding the contact as the second driving assistance processing when communication with the host computer is in an incapable state and also a predicted time until the contact between the vehicle and the object is determined to be equal to or less than a predetermined time from the result of the second arithmetic processing, and when the communication with the host computer becomes capable during execution of the contact avoidance processing, configured to prohibit execution of the first driving assistance processing and to continue the contact avoidance processing.

9. The driving assistance system of the vehicle according to claim 6, wherein the vehicle information acquisition unit is configured to acquire information related to the object existing in the periphery of the vehicle, the first arithmetic processing unit is configured to perform a processing of determining a contact possibility of the vehicle and the object with respect the vehicle information data including information related to the object existing in the periphery of the vehicle acquired by the vehicle information acquisition unit, as the first arithmetic processing, and when the communication with the vehicle returns to a capable state from an incapable state and the first arithmetic processing is performed, to continue the first arithmetic processing if a predicted time until the vehicle and the object contact is longer than a predetermined time, and to terminate the first arithmetic processing and to transmit to the vehicle contact avoidance instruction data which instructs a contact avoidance control for avoiding contact of the vehicle and the object if the predicted time until the vehicle and the object contact is equal to or less than the predetermined time, and the driving assistance unit is configured to perform the contact avoidance control when the contact avoidance instruction data is received.

10. The driving assistance system of the vehicle according to claim 6, wherein the vehicle comprises a road environment recognition unit configured to recognize a road environment where the vehicle is traveling, the vehicle information acquisition unit is configured to acquire a captured image of a camera equipped to the vehicle as the information related to the object existing in the periphery of the vehicle, and the second arithmetic processing unit is configured to detect an animal preferentially as the object from the captured image and to perform a processing of determining a contact possibility with the vehicle, as the second arithmetic processing, when it is recognized by the road environment recognition unit that the vehicle is traveling a road in a suburban area, and configured to detect a pedestrian preferentially as the object from the captured image and to perform the processing of determining the contact possibility with the vehicle, as the second arithmetic processing, when it is recognized by the road environment recognition unit that the vehicle is traveling a road in a city area.

* * * * *